(12) United States Patent
Cecconi et al.

(10) Patent No.: US 6,614,718 B2
(45) Date of Patent: Sep. 2, 2003

(54) DEVICE AND METHOD FOR SEISMIC DRILL HOLE MEASURING

(75) Inventors: Fabio Cecconi, Drancy (FR); Louis Soulier, Sannois (FR)

(73) Assignee: GeoServices S.A., Le Blanc Mesnil (FR)

( * ) Notice: Subject to any disclaimer, the term of this patent is extended or adjusted under 35 U.S.C. 154(b) by 0 days.

(21) Appl. No.: 09/795,478

(22) Filed: Mar. 1, 2001

(65) Prior Publication Data

US 2002/0060952 A1 May 23, 2002

(30) Foreign Application Priority Data

Mar. 1, 2000 (FR) .............................. 00 02625

(51) Int. Cl.⁷ ................................ G01V 1/40
(52) U.S. Cl. ..................... 367/86; 73/152.54
(58) Field of Search ........................ 367/86, 38, 911, 367/57, 912; 181/108, 102; 166/250.01; 175/40; 340/853.9, 854.5; 73/152.54

(56) References Cited

U.S. PATENT DOCUMENTS

| | | | |
|---|---|---|---|
| 4,305,041 A | | 12/1981 | Frerking |
| 5,555,220 A | * | 9/1996 | Minto .................. 166/250.01 |
| 5,962,819 A | | 10/1999 | Paulsson |
| 6,023,444 A | | 2/2000 | Naville et al. |

FOREIGN PATENT DOCUMENTS

WO    WO 00/00847    1/2000

* cited by examiner

*Primary Examiner*—Gregory J. Toatley, Jr.
(74) *Attorney, Agent, or Firm*—Oblon, Spivak, McClelland, Maier & Neustadt, P.C.

(57) ABSTRACT

Seismic waves are recorded twice by a reference sensor (8) above ground and by a sensor (18) located in the drill hole (1). Measurements are synchronized by a clock system, the clock associated with sensor (18) being designed specifically for providing such synchronization in spite of operating conditions prevailing at the bottom of a drill hole (vibrations, shocks, temperature).

26 Claims, 8 Drawing Sheets

DEVICE AND METHOD FOR SEISMIC DRILL HOLE MEASURING

The invention relates to a device and method for seismic drill hole measuring, and allows to perform seismic exploration of surrounding formations during oil well drilling.

Seismic measurements during oil drilling are well known: a seismic wave source is placed on the ground at a certain distance of the drill hole and produces shock waves propagating into the formation. Propagation can be either direct or indirect (through reflection on geological underground interfaces). These waves are detected by a sensor, like a hydrophone, geophone, or accelerometer. The direct and indirect propagation times allow the vertical seismic profile and the position of seismic reflectors located under the drill bit to be calculated. In order to perform these calculations of position, at least two of these sensors must be available, one of which is arranged above ground and the other one is located downhole. This example is not restrictive for seismic measurements during drilling as it is quite possible to have an arrangement the other way round according to which the seismic source is placed downhole (e.g., it may be the drill bit), and in this case, the reference sensor will be placed in the measuring tool, and the seismic sensors will be located above ground. In this configuration also, seismic wave can propagate directly towards the surface or be reflected on geological interfaces located under the drill bit and then propagate towards the surface. And in a way similar to the preceding one, it will be possible to determine the position of these seismic reflectors.

However, difficult and so far unsolved problems are posed for synchronizing, without an electric link, the measurements associated with both under and above ground sensors because of the seismic wave propagation speed and required precision. Indeed, wave propagation speed is on the order of 2000 to 5000 m per second in sedimentary ground and measurements must allow to determine the position in space of the reflectors with an inaccuracy better than 10 m from the surface. In terms of relative inaccuracy, i.e. regarding the mutual position of the various reflectors, it must be on the order of one meter. And yet, none of the conventional clocks that could be associated with the sensors and that would allow to conform to the required precision would survive to the operating conditions prevailing at the bottom of a drill hole (vibrations, shocks, temperature). However, the usefulness of such measurements is no longer to be demonstrated, indeed, they allow for instance to determine the position of cracks and reservoirs under salt domes or to clarify the interpretation of surface seismic data (in case of reservoirs the image of which is overshadowed by the presence of a gas cloud above them).

A sample prior device of this type of measurement in this technical field is described by the French patent no. 2 742 880 of Institut Français du Pétrole, proposing alternative methods for solving the problem of measurement synchronization, as e.g. using an electromagnetic transmission or using vibratory waves propagating inside the drill string for correcting clock drifts after the event. However, although these synchronization methods allow the clock synchronization error to be maintained at several milliseconds, which is just about acceptable, it has to be added that in test synchronization is not always possible as certain formations dampen electromagnetic waves to such a degree that the signal to noise ratio at the downhole receiver does not allow the desired synchronization to be achieved. In the same way, vibratory waves propagating along the drill string can be dampened to such a degree that they can no longer be detected above ground.

U.S. Pat. No. 5,555,220 is also to be mentioned, describing a seismic probe fixed to a cable and lowered into the well. This probe requires drilling to be stopped each time it is used and it has to be brought back to the surface before drilling is resumed, which is restrictive but does not pose any serious problem of synchronizing the clock, the drift of which is low due to the tests envisaged by this specific technique being short: an ordinary quartz crystal clock enclosed in an insulating enclosure is sufficient.

The invention is a solution to this measurement synchronization problem in the specific context of long-term seismic testing, for which the events responsible for clock drift, above all overheating, are fully apparent even through an insulating enclosure, and relative drifts, which would be admissible for short durations, then produce excessive total drifts; it is based on the development of hyperstable clocks adapted to the conditions of such testing so as to have a very low output frequency drift only (between $10^{-8}$ and $10^{-9}$ in relative values, i.e. 1 to 10 ppb (part per billion)). Inaccuracy of synchronization is then comprised between several tenths of milliseconds and one millisecond for a test duration of several days, which is the typical duration of a test with a tool left downhole, and which allows perfectly synchronized measurement acquisitions to be performed independently of well conditions and without requiring any action slowing down the drilling process.

Although it is relatively easy to find clocks meeting this drift requirement for the surface sensor, this is quite different for the underground sensor clock, which is constantly likely to go out of order due to temperature changes, shocks, and vibrations. The development of this clock has therefore been a crucial issue of the invention.

In its most general form, the invention relates to a device allowing seismic measurements to be performed in a well during drilling, comprising, above ground, a seismic source and a recorder connected to one or several seismic reference sensors and, downhole, a seismic sensor mounted in a drill string, wherein the seismic sensors and recorders are associated with a low drift synchronized clock system, characterized in that the clock associated with the underground seismic sensor is a dual mode type clock (as described in U.S. Pat. No. 4,872,765).

Moreover, the clock associated with the tool seismic sensor is enclosed in an enclosure (of Dewar type or made of insulating materials) including a thermal regulation means so as to allow clock temperature control.

The thermal regulation system normally comprises a heating means, but it is also possible to use a cooling means (e.g. like Peltier modules) or even a combination of both means. The control temperature can be varied by the user, it is then possible to choose a temperature value slightly higher than that of the well in order to minimize power input required for thermal regulation.

The clock of the reference sensor located above ground can be a quartz crystal clock preferably maintained at a temperature determined according to a frequency stability area of the quartz.

A method in accordance with the invention thus consists in installing a seismic source, an above ground seismic reference sensor, a downhole seismic sensor inside a tool integrated in a drill string, providing low drift clock sensors, lowering the tool into the well and sending seismic waves to the sensors via the formations to be investigated; it is characterized in that the well clock is maintained at a given but variable temperature, and in that clock synchronization is performed when the given temperature is modified.

According to another specific method, a unique synchronization, prior to testing, is performed before the tool is lowered into the well, and the temperature of the well sensor clock is maintained at a uniform value.

The invention also implies using techniques for synchronizing clocks, starting measurement recordings, and retrieving the recorded data during the test campaign, when the tool is engaged in the well. Some of these techniques are known, but will be recalled briefly in this document.

The invention will be described more in detail by means of the following figures, which will make the characteristics, features, and advantages thereof more apparent:

Figure 4:
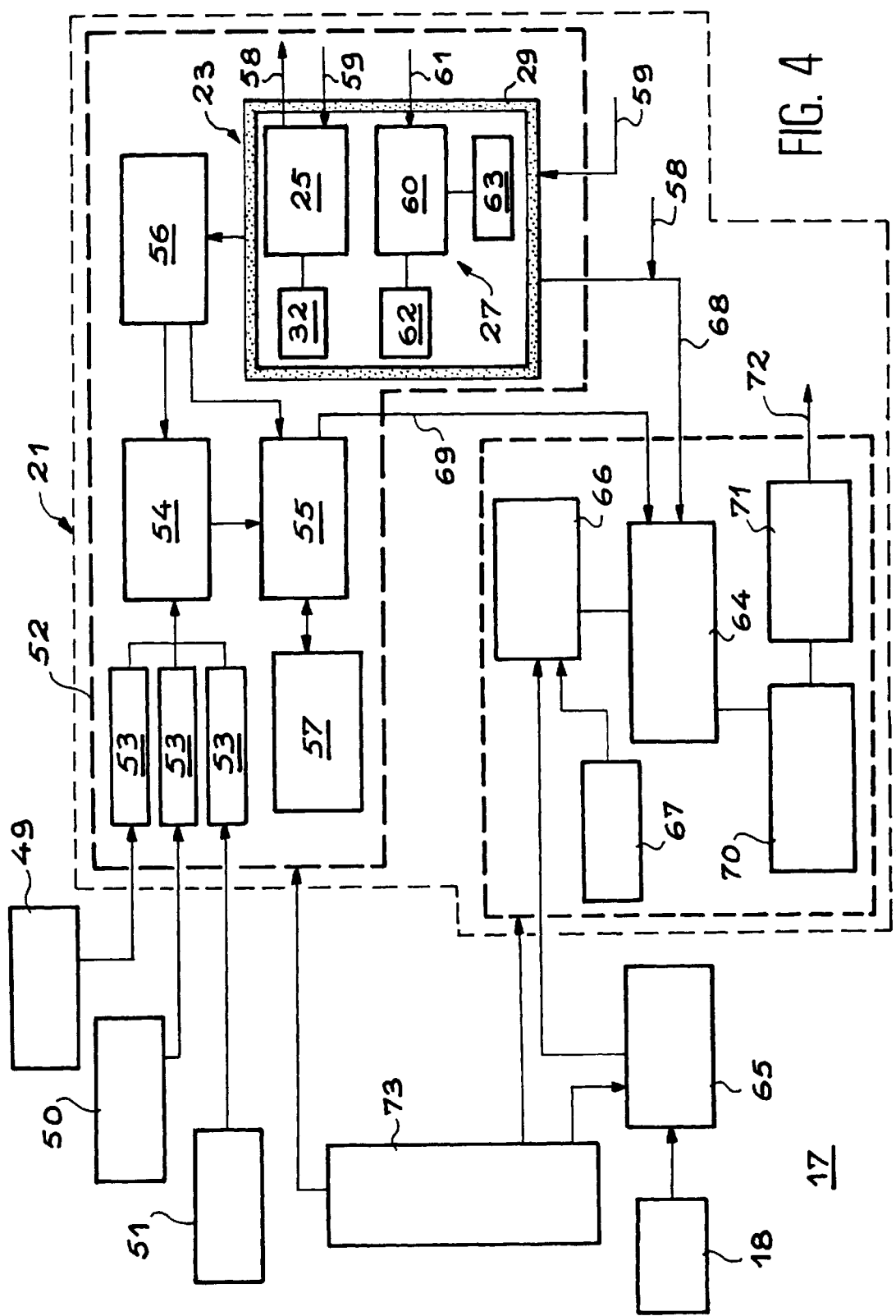
Figure 5:
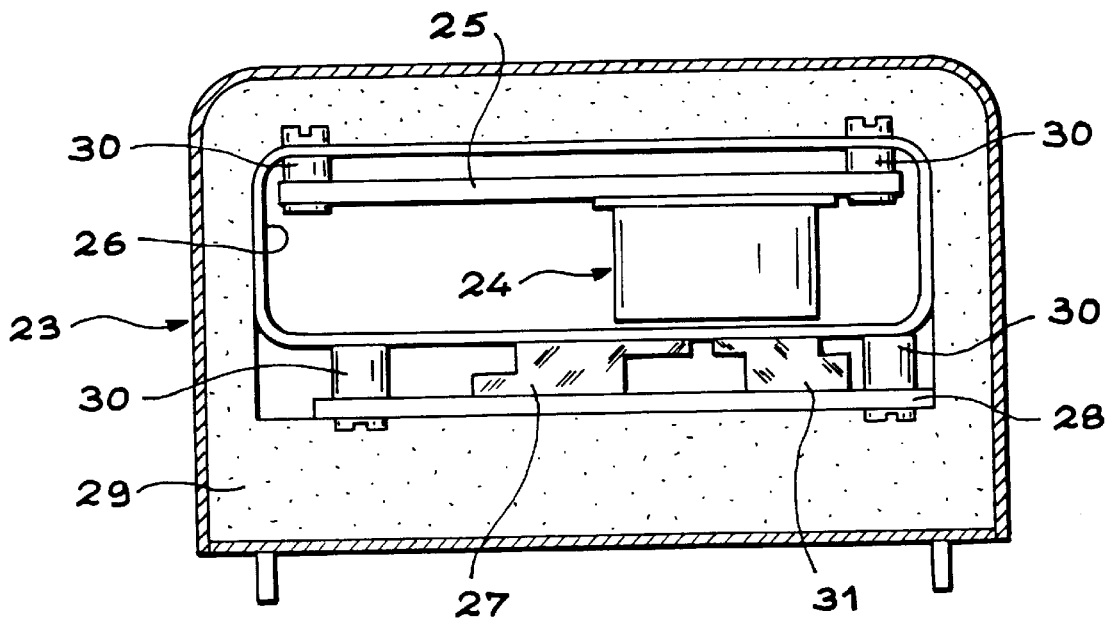
Figure 7:
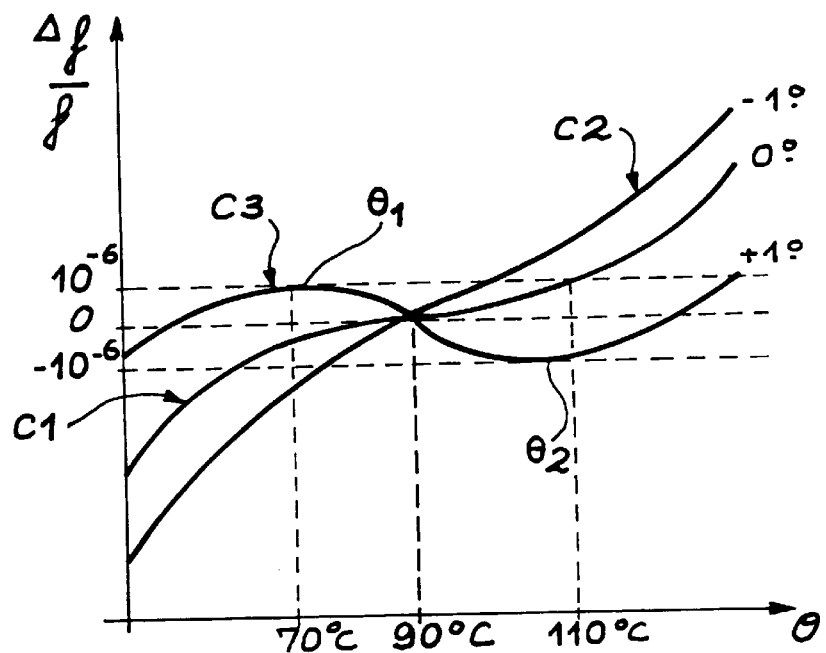
Figure 6:
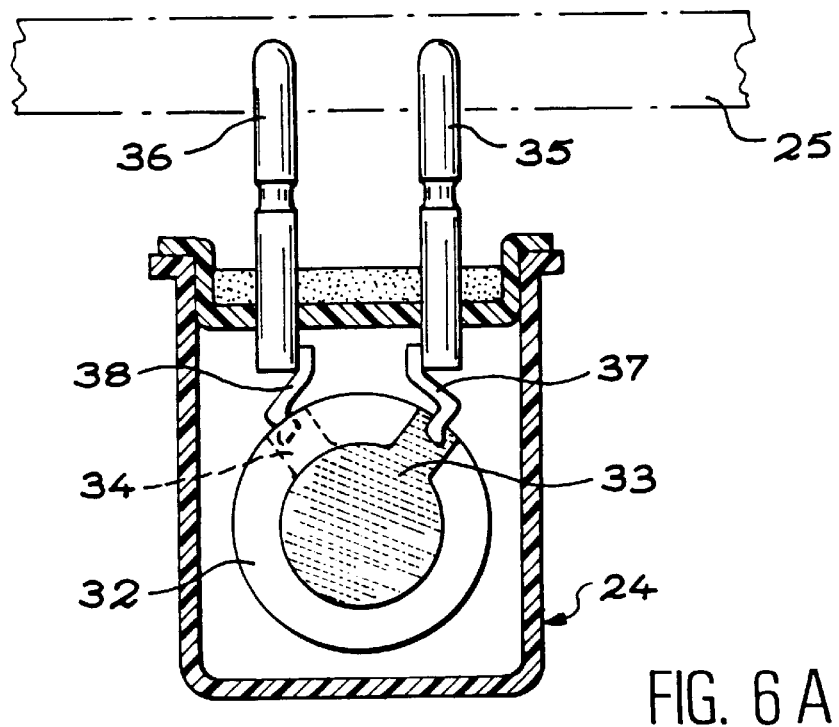
Figure 6:
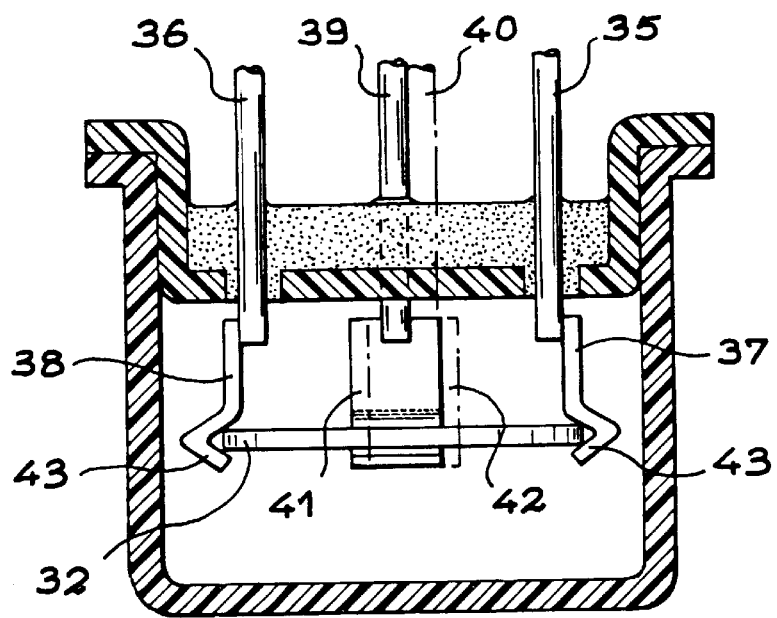
Figure 8:
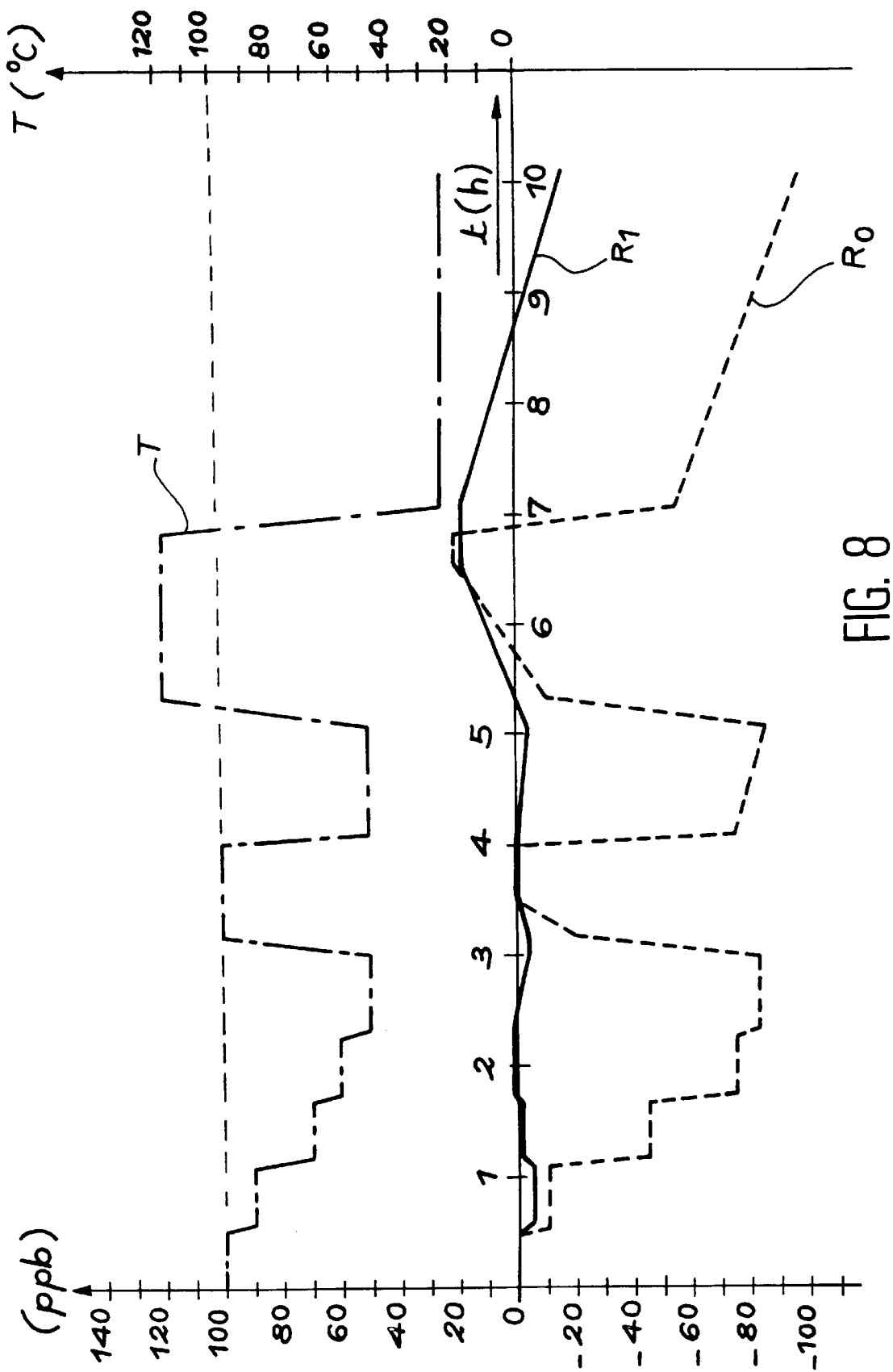

FIG. 4 schematically illustrates the measuring system in the form of a flowchart;

FIG. 5 illustrates the underground clock;

FIGS. 6a and 6b illustrate two possible embodiments of the clock quartz assembly;

FIG. 7 gives an example of frequency variation as a function of temperature curves for an SC-cut quartz; and FIG. 8 illustrates frequency variation as a function of temperature in several experimental situations.

Figure 1A:
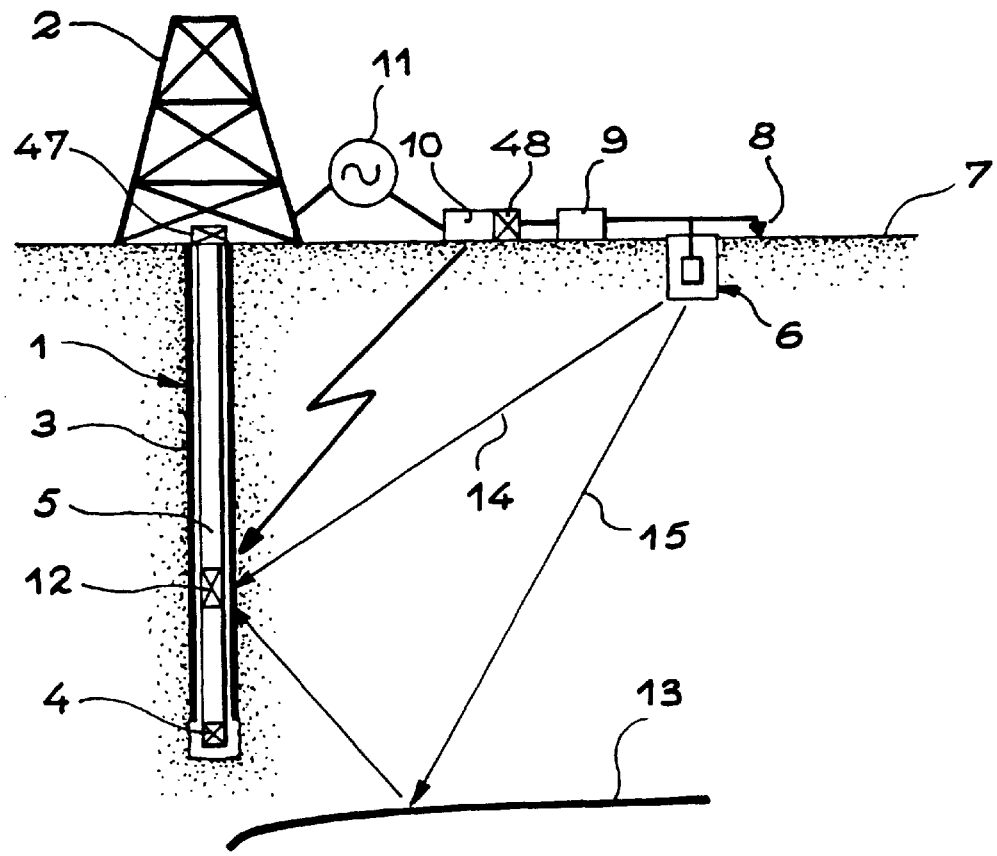
FIG. 1a illustrates the general aspect of the seismic measuring device.

With reference to FIG. 1a, it appears that a well 1 has been drilled under a derrick 2, wherein this well can be partially covered in its upper part by a casing 3. A drill bit 4 is located at the bottom of well 1, suspended at a drill string 5. The equipment used for the invention comprises a seismic source 6 buried under the surface 7 of the ground, a reference geophone 8, a surface seismic recorder 9, a control module 10, as well as an electromagnetic transmitter 11, all located above ground 7 and connected together. Finally, a tool 12 is located in the drill string 5 not far from the bottom of the well, at a certain distance of drill bit 4. The tool 12 is assigned to measurements in the well.

Figure 2:
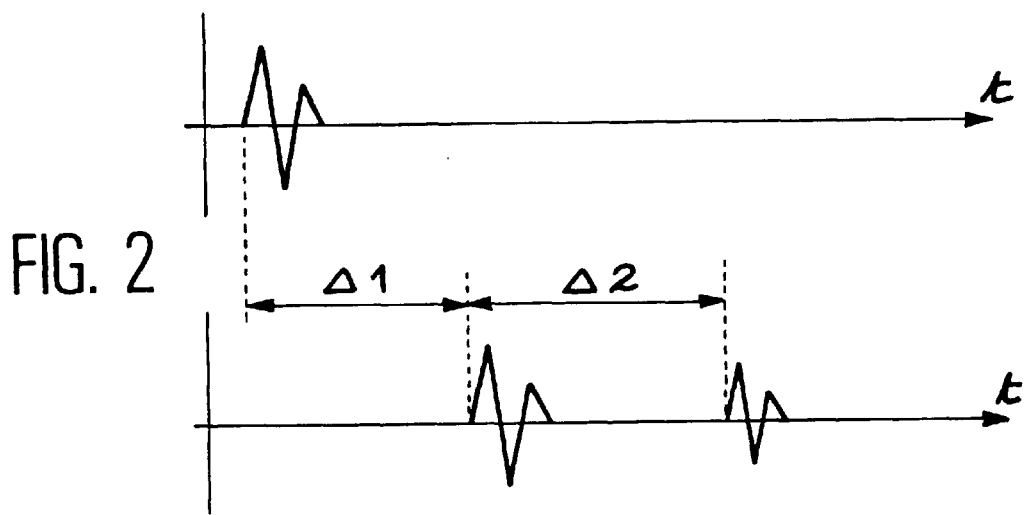
FIG. 2 illustrates measurement breakdown.

When the seismic source 6 is transmitting waves, they are detected by the reference geophone 8 and the seismic sensor arranged inside the tool 12. The geological variances of the formations drilled appear in the presence of seismic reflectors, such as 13, which generate reflected and transmitted waves. Thus, the sensor located in tool 12 can receive the wave through a direct 14 or reflected 15 path. The top diagram of FIG. 2 represents a wave form transmitted by source 6, as it is retrieved by the reference geophone 8, the bottom diagram illustrates that tool 12 is receiving the wave twice, firstly through the direct path 14 of the incident wave, after a time $\Delta 1$, and secondly through the reflected path 15 after the additional time $\Delta 2$; as the reference geophone 8 is close to the seismic source 6, it receives the shock wave almost immediately, and the length of the direct path 14 is proportional substantially to $\Delta 1$, that of the reflected path 15 to the sum ($\Delta 1+\Delta 2$). A sufficient number of these measurements, repeated for various readings of tool 12 (in general, one measurement every 10 m), allows to determine the position of interface 13. However, it is necessary for the measurements of the reference geophone 8 and the sensor located inside tool 12 to be synchronized with very high precision for the measurement of $\Delta 1$ to be correct.

Figure 1B:
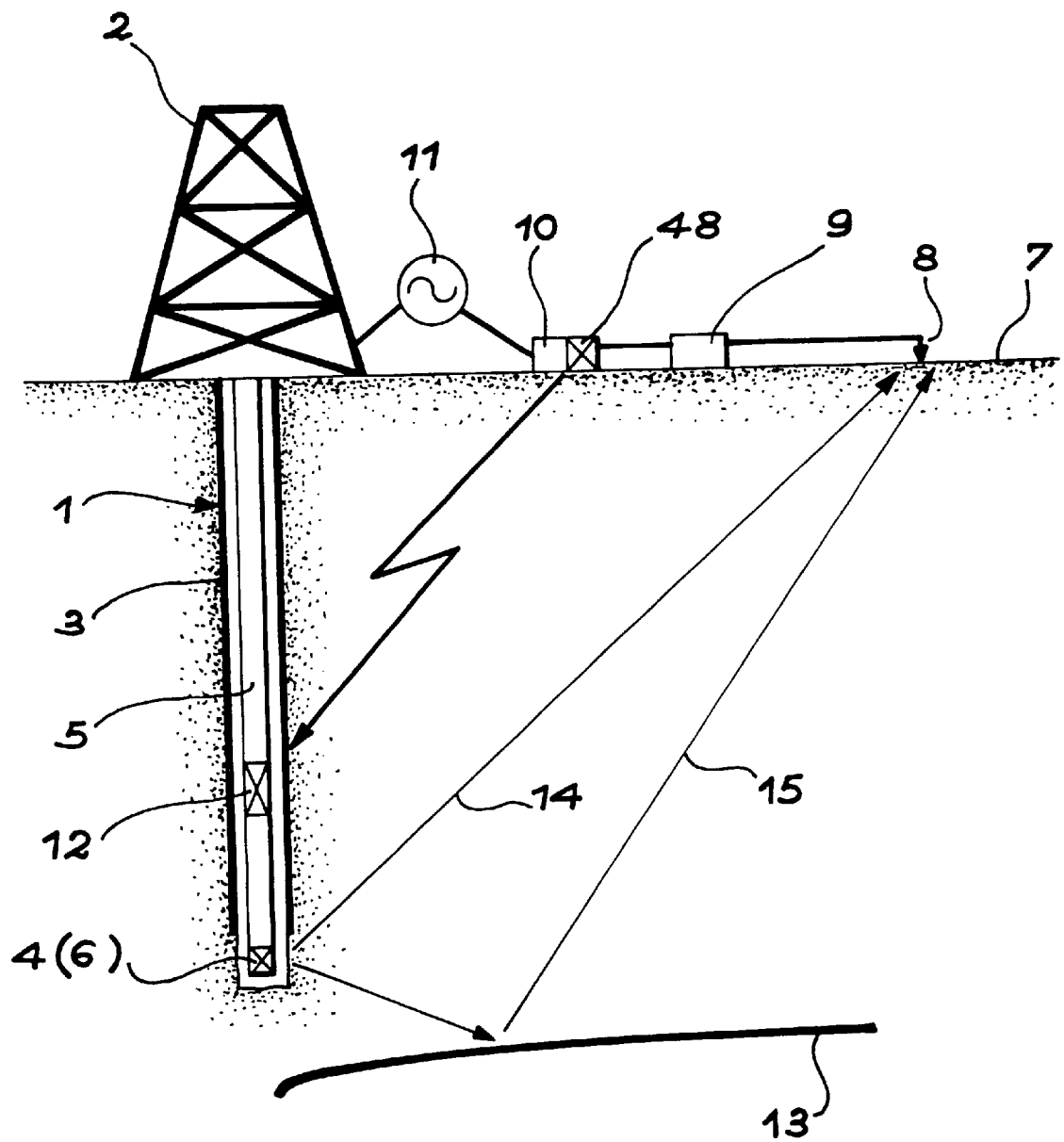
FIG. 1b illustrates an alternative method of the seismic measuring device.

FIG. 1b describes a similar arrangement, except that the seismic source is integrated in drill bit 4 and thus located downhole: measuring involves wave paths 14 and 15 reaching geophone 8, which is then the farthest away from the seismic source, and the tool sensor is used as a reference sensor. Thus inverting the roles of the sensors has no impact on their structure.

Figure 3A:
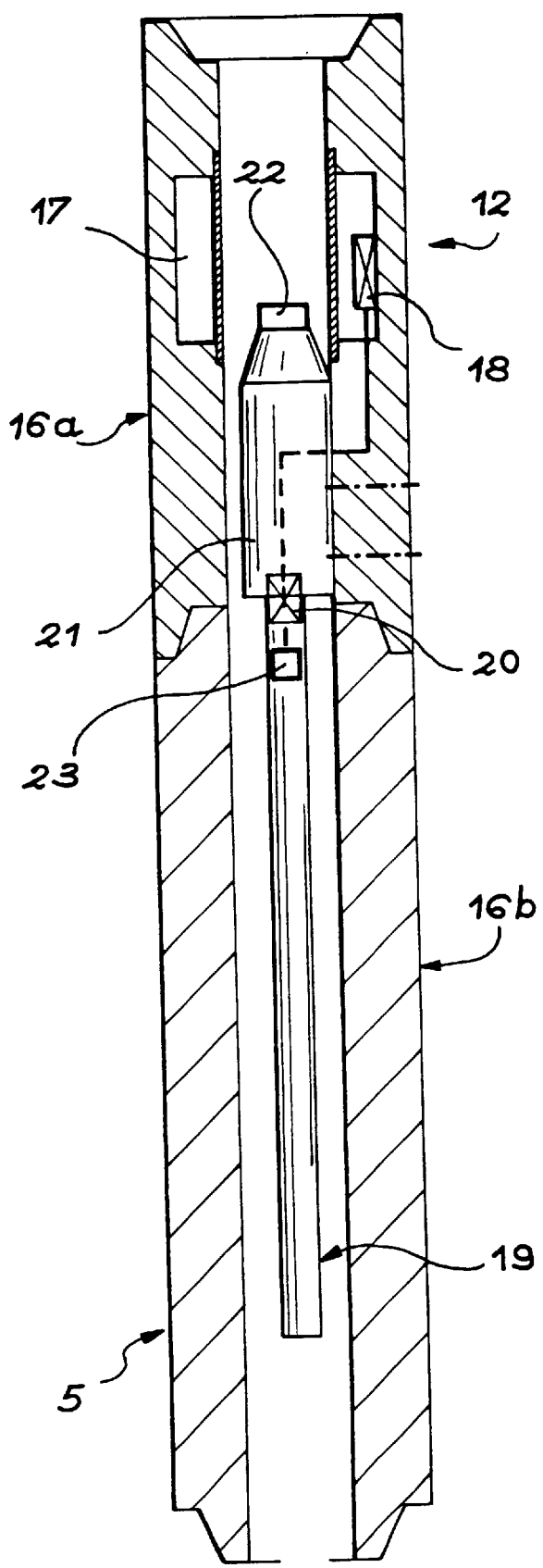
FIG. 3a illustrates the configuration of the downhole equipment.

FIG. 3a shows a possible embodiment of the seismic tool 12. In the embodiment shown, tool 12 is composed of two drill collars 16a and 16b belonging to drill string 5; drill collar 16a comprises a leak-free chamber 17 wherein in particular the tool seismic sensor 18 can be accommodated.

A casing spear 19 is removably fixed to the drill collar 16a via a mechanical element 21 called monopod. Monopod 21 also ensures the electric link between the tool sensor 18 and the casing spear 19 via connector 20. Casing spear 19 contains the acquisition and storage modules, the underground clock 23 as well as the power source (battery) ensuring power supply to the system. Monopod 21 can be fitted with a leak-free connector on its upper part, thus allowing it to connect to casing spear 19 via a cable from the surface.

Figure 3B:
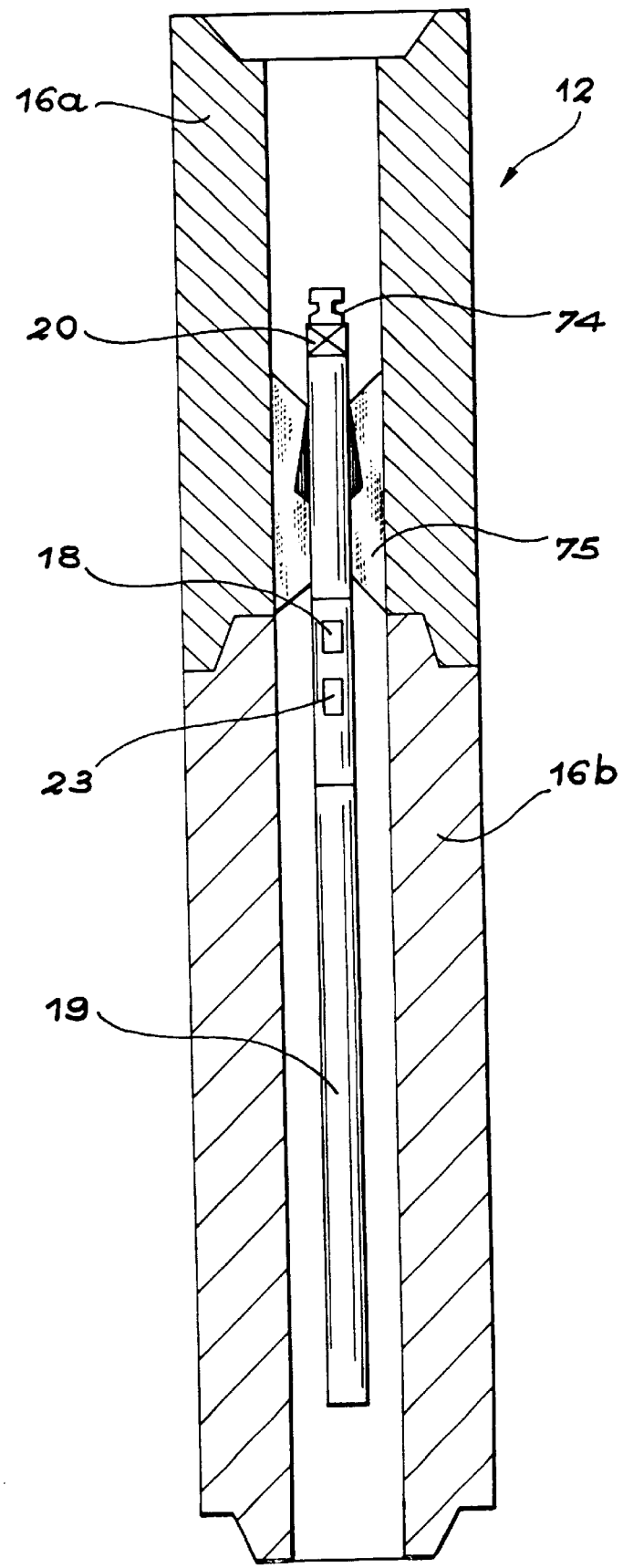
FIG. 3b illustrates an alternative configuration of the downhole equipment.

In an alternative embodiment shown in FIG. 3b, it is possible to place the seismic sensor 18 inside casing spear 19, fit the latter with a fishing head 74, and replace monopod 21 with an anchoring system 75 (generally called "latch" in the art), which allows the casing spear 19 to be fished by means of a conventional slickline cable as described below in this document, then to put it back using the same slickline cable or more simply by free fall through the inside of drill string 5.

The seismic source 6 can be an air gun, a vibrator or an explosive. There can be several sources arranged along precise axes, and these sources can be fixed or mobile for certain methods, as those that are known as "Walkaway VSP", "Walkabove VSP". The reference geophone 8 could be replaced for instance with a hydrophone or an accelerometer, or with a greater number of sensors. The reference sensor(s) can be arranged not only near the seismic source 6, but also on the drilling rig or on the drill string 5 itself. Also, the tool sensor 18 can equally be a geophone, a hydrophone, or a highly sensitive accelerometer. There may be only one sensor oriented along the vertical axis of tool 12 or any other axis, but it is also possible to use several sensors oriented along various axes. A specific case consists in fitting the tool 12 with three seismic sensors arranged along three mutually orthogonal axes so as to record the three components of the seismic signal. In this case, the seismic recording is useful even if inclination and orientation are unknown. However, seismic processing will be made easier if an MWD tool (inclination and orientation measuring system commonly used for drilling) is mounted near the tool as all that has to be done in this case is to read the angular position of both tools so as to be able to determine sensor orientation at the time of measuring.

As mentioned before, synchronization of underground and above ground measurements by the reference geophone 8 and the tool sensor 18 is crucial for making use of seismic data. Indeed, synchronization facilities have to be provided as well as means for correcting them. It is proposed to use a system of synchronized clocks having an extremely low relative drift, such clocks being respectively associated with above ground and underground sensors. Clock 48 associated with control module 10 and reference geophone 8 is considered as the reference clock of the system: this is the clock enabling dating of the records made by the seismic recorder 9 and it is with respect thereto that the underground clock 23, associated with tool sensor 18, will be set and synchronized.

Making a clock that can be integrated in casing spear 19 poses a difficult problem as operating conditions regarding vibrations, shocks and temperature are severe. The embodiment chosen implies using a quartz crystal clock, in spite of certain causes of inaccuracy that will be explained below.

FIG. 7 gives the beat frequency f curve of a quartz cut according to the SC cut (using the terms of the art) as a function of temperature θ. According to the cut angle, curves like C1, C2, or C3 will be obtained, which show frequencies almost equal to a temperature of 90° C.: if the quartz is maintained close to this temperature, its frequency will vary very little, above all if it is cut at the angle of curve C1, which has an almost uniform stage for this temperature value. More generally, it will be possible to maintain the quartz at a temperature where the curve of frequency variation as a function of temperature has zero drift. Close to these points, the relative frequency variation is only several parts per billion for several degrees of temperature variation. Results slightly less good would be obtained with other quartz cuts, like the AT cut.

Curves C2 and C3 give other curves of relative drift for deviations of −1 ° and +1 ° from the cut angle of curve C1. It appears that a relative drift of $10^{-7}$ or $10^{-6}$ is in general reached as soon as the temperature has varied by several dozens of degrees.

However, merely temperature controlling a quartz is not enough for building a satisfactory underground clock, as temperature variations can be considerable and sudden inside a well, so that the temperature control system cannot immediately compensate therefore. Also, such an embodiment only solves the synchronization problem for temperatures lower than the chosen temperature; and yet, in order to cover all temperatures, the highest temperature likely to be encountered in a well (e.g. 150° C.) would have to be chosen, but in this case, controlling at this temperature would require more power than can be accommodated in the tool batteries. Therefore, this solution, made plausible by FIG. 7, is to be abandoned.

We have been brought to choose a dual mode type clock automatically correcting frequency as a function of temperature, wherein temperature data θ is given by the quartz itself by means of the beat between the fundamental tone frequency (f1) and the partial tone 3 frequency (f3) divided by 3, which is a linear function of temperature according to the formula $$\left(f1 - \frac{f3}{3} = k\Theta\right).$$

Frequency correction is then performed digitally according to the values of curve $f_1(\theta)$ measured before. This method allows to obtain good frequency stability as a function of temperature. However, the precision obtained by this self-correcting method is on the order of $10^{-7}$ (within the temperature range from 0° C. to 125° C.) and is not enough for our application; therefore, we propose to improve this clock by stabilizing the quartz temperature in order to obtain better results and which allow to achieve the objectives.

The underground clock device 23, represented in detail in FIG. 5, thus comprises, around a casing 24 wherein the quartz crystal is enclosed, an electronic circuit 25, a jacket 26 containing casing 24 and the electronic circuit 25, a heating device 27 connected to jacket 26, a circuit 28 controlling device 27, and an external enclosure 29 filled with a product such as silica aerogel as powder, or another material chosen for its good thermal insulation. A thermal insulation method based on using a Dewar type enclosure can also be used. Moreover, screws and washers generally referenced as 30 attach all previously mentioned elements to the inside of enclosure 29 and among themselves in order to provide the required mechanical stability thereto. The electronic circuit 25 comprises an oscillator circuit performing quartz frequency correction as described above, and a setting module allowing the output frequency of clock 23 to be set precisely as a function of reference clock 48 at the time of a preliminary above ground synchronization. The oscillator output frequency can be set, e.g. to 10 MHz. It is possible to control the heating intensity of jacket 26 via elements 27 and 28 in order to perform temperature control of the contents of enclosure 29 and limit frequency drifts of underground clock 23 and the inaccuracies caused thereby.

FIG. 8 allows to compare, under variable temperature conditions, the results obtained by a single dual mode type frequency correction, then combining the latter with thermal regulation at 100° C. Curve T represents the enclosure temperature (right-hand scale in degree Celsius), curve R0 represents the relative frequency variation of the clock without thermal regulation (left-hand scale, relative frequency variation in parts per billion), curve R1 represents the relative frequency variation of the clock with thermal regulation (left-hand scale, relative frequency variation in parts per billion).

This experiment allows to highlight the stability gain obtained by temperature stabilization. Indeed, without thermal regulation, the drift can reach 100 ppb ($10^{-7}$) whereas this drift remains less than 10 ppb ($10^{-8}$) if the clock has thermal regulation.

The test has been completed by setting the ambient temperature above the regulation limit temperature (100° C.), then below the regulation lower limit value (50° C. in this case) in order to simulate certain heating or cooling conditions in the drill well and in both instances, the drift has of course been greater (20 ppb) but acceptable considering that these events are temporary.

It is possible to add a thermal dissipation means (this can be a Peltier effect module 31 also connected to jacket 26) to the device described before. Such a device would allow to maintain the ideal operating temperature of the quartz in case the ambient temperature is greater than this temperature. It is also possible to reduce the regulation lower limit temperature by increasing the amount of power used in the thermal regulation device.

However, if the maximum temperature of the well is known beforehand, it is then possible to choose the regulation point to be several degrees above this temperature and a control obtained with a single heating device can be sufficient in most instances.

It should be stressed that using a dual mode type clock as described above allows to choose the control temperature of the thermal regulation (within the usual temperature range approximately from 0° C. to 125° C.) while keeping the required precision, in contrast with an OCXO type clock where control has to be done with respect the stability temperatures of curves C2 and C3 (points where the drift of the frequency/temperature function is canceled). This is very important for long term tests, where it is not always possible to provide sufficient regulation power to enclosure 29 for maintaining the maximum stability temperature of the quartz.

Finally, the choice of the control temperature can be permanent or not: it can be changed either by bringing back tool 12, or by communicating therewith through one of the means described below in another context (electromagnetic transmission, electric cable, secondary casing spear, etc.).

The other constraint is regarding shocks and vibrations undergone by tool 12. Downhole, the tool can undergo shocks equivalent to a 1000 g ½ sinus lasting one millisecond and vibrations the accelerations of which can reach an effective 20 g in the band from 20 Hertz to 2000 Hertz.

FIG. 6a shows how the crystal 32 fitted with associated electrodes 33 and 34 is mounted inside casing 24, the connecting pins 35 and 36 connected to electronic circuit 25 leading to respective electrodes 33 and 34 through flexible conductive attachment clips 37 and 38 soldered to electrodes 33 and 34 which allow the crystal 32 to be held without it touching casing 24. The arrangement of FIG. 6b should also be mentioned, wherein the crystal 32 is placed flat, in parallel to the electronic circuit 25, and wherein two pins 39 and 40 are added to the preceding ones 35 and 36, and two additional attachment clips 41 and 42 are respectively connected to these new pins 39 and 40 and which are also for holding crystal 32. The attachment clips 37, 38, 41, and 42 are now placed on two diameters perpendicular to crystal 32 which they enclose resiliently. As before, they are soldered to pins 35, 36, 39, and 40. This four-point arrangement has a much better mechanical resistance than the previous one and is therefore preferred.

Reference clock 48 associated with reference module 10 is not subjected to the same constraints. All that is required here is an OCXO type quartz crystal clock, the operating temperature of which has been chosen to correspond to one of the zero drift points of the frequency/temperature curve, according to the explanations given regarding FIG. 7. Frequency stability on the order of $10^{-9}$ can be obtained with this type of clock. Another suitable clock is an atomic clock (based on atomic energy transitions of a gas that is electrically energized); stability will be even better ($10^{-11}$), but a more delicate implementation will be required. It has to be stressed that such a clock is not suitable for tool sensor 18.

When casing spear 19 is above ground, it is possible to connect it directly to the control module 10 and measure the underground clock frequency 23 with respect to the reference clock frequency 48 and to modify it if required; it is also possible to measure the relative clock drift and cancel it at the time of the initial synchronization. Although it is an advantage of the invention that no subsequent synchronizations are required, the possibility can be maintained to repeat synchronizations when tool 12 is engaged in the well 1. They can be useful if the regulation temperature of clock 23 is modified. Some synchronization methods will be recalled below.

It is possible to provide the use of remote transmission such as electromagnetic transmission. The principle is based on transmitting a wave into the ground through the electromagnetic transmitter 10. The message comprises a synchronization code which, when it is recognized by tool 12, enables it to determine its possible drift. The drift value will be recorded in memory for subsequent data processing and it will also be possible to send it to the surface through a feedback electromagnetic wave. Recognizing the synchronization code within a noisy environment calls for known signal processing techniques. It should be noted that this technique in itself enables underground and above ground measurement synchronization. However, this method is only suitable if the characteristics of the formations passed through allow for electromagnetic wave transmission with attenuation compatible with the signal to noise ratio required for the desired synchronization. Otherwise, tool 12 cannot receive the synchronization code, and substitute techniques must be envisaged.

In case synchronization code receipt is no longer possible from a given depth on, it is still possible, on the occasion of a hole control or redrilling trip, to go back above this limit depth and proceed to a synchronization control at this level. The drift value thus measured will be recorded in the tool memory for subsequent processing.

Another possibility is to connect tool 12 to the surface system through cable 19. This operation is possible using the electric cable technique well known in petrol circles, which consists in lowering a single or multiple feeder cable inside the drill string 5 and in connecting it at the top of the monopod 21 through leak-free connector 22 provided for use in such environments. Once communication has been established, synchronization signals can then be sent from the surface to tool 12. The cable is then disconnected from the casing spear 19 and brought back to the surface. A disadvantage of this method is to impose a complete standstill of drilling operations.

Therefore, we have thought of a much less restrictive alternative method of using a stand-alone secondary casing spear which is synchronized with the surface clock, which is then lowered into the well 1, either by free fall or at the end of a so-called "slickline" metallic cable. The latter is connected to the main casing spear 19 via connector 22 and it is then possible to measure and cancel the drift of the main casing spear with respect to the secondary casing spear. Considering the low time difference (maximum 30 minutes) between the time the secondary casing spear is synchronized with the surface clock 48 and the time the secondary casing spear is connected to the main casing spear 19, it can be considered that as a result of this operation, the main casing spear 19 is perfectly synchronized with the surface clock 48.

Another possible method consists in repeating, when the drill string is brought back or during a hole control trip, the seismic recordings that have been performed during the drilling phases, of course at the same readings. Thereby, it will be possible, for instance at the direct times of arrival corresponding to the same positions of the drill string, to measure which was the drift value between these two recordings.

Several devices for starting recordings through tool 12 are provided depending on the circumstances. A first method consists in starting the recording automatically at regular intervals defined beforehand. Inside tool 12, a regular triggering rate is programmed, e.g. a duration of one minute every ten minutes, and the recording will take place whatever happens. Using synchronous clocks like those described before allows to know the precise instants of these recording periods. Therefore, for performing a seismic recording, all that has to be done is to stop drilling for a few moments before one of the programmed recording periods, run the acquisition on the above ground recorder 9, and generate a shock wave by means of air gun 6. At the end of the programmed recording time, drilling will be resumed.

This recording device can be improved by adding a motion sensor (e.g. a sufficiently sensitive accelerometer) thereto, and in this case, the recording only takes place when the drill string is stationary; this condition is mandatory for a high quality seismic recording and immobility of the drill string can be detected by means of the motion sensor (the easiest means being to consider that the drill string is stationary when accelerations measured are below a threshold of 0.1 g, e.g.).

Our preferred triggering method consists in using detection of drill string 5 movements: a sufficiently sensitive accelerometer is placed inside casing spear 19 in the axis of drill string 5, the integration of the values supplied thereby gives the speed and direction of the travel of drill string 5. It is then possible, by alternately operating it up and down, to send a code to tool 12 and thus activate the recording procedure. In the same way, if the accelerometer is placed perpendicularly to the tool axis, the tool is sensitive to the drill string 5 rotating motion, and it is then possible to trigger the recording start by alternating rotating and non rotating phases according to a precise sequence, which is predetermined and known by tool 12. These two methods can also be combined (using two accelerometers) in order to reduce the risks of unexpected starting.

It would also be possible to use certain known methods like:

1) Transmitting a specific electromagnetic code from the surface through transmitter 11, upon receipt of which tool 12 starts a recording after a fixed delay, also known by the surface system. Transmitter 11 can send other commands, like recording time, and control synchronization as mentioned before.

2) Using a flow switch integrated in tool 12. Such an instrument responds to the pressure difference between the inside and outside of drill string 5: in particular, it varies between pumping and non pumping phases, which allows the stopping of the drilling pumps to be detected at the bottom of well 1, and it is then possible to send a recording start command to tool 12, from the surface, affecting the drilling pumps. For this purpose, a known method consists in performing a series of pump on/off sequences according to a predefined sequence. This sequence is then a code that can be recognized by tool 12. Another possible embodiment of the flow switch consists in artificially creating a pressure loss at the casing spear 19, e.g. by fitting it with a fin system, and in the same way as before, the pressure difference of the pressure loss thus created will vary between pumping and non pumping phases, which will allow drilling pump start or stop to be detected and the recording to be triggered.

The data recorded, regarding seismic tests and synchronizations, is stored in the memory module integrated into casing spear 19. When the whole drill string 5 is brought back to the surface, the casing spear 19 is disconnected from monopod 21 and it is connected to a reading system allowing the data to be stored quickly on a computer medium for subsequent processing. However, if the data is to be available at the end of the drilling operation, three other methods are provided for accessing the data.

The first one is done by fishing the casing spear 19 with the slickline cable, and after memory readout, casing spear 19 is lowered back down and put back in place, either through the same method or by free fall in the drill string 5; it is automatically anchored in a receiver device fitting the drill collar 16 (represented in FIG. 6*b*). It should be noted that this fishing operation is an operation well known in petrol circles for other tools, but it requires drilling operations to be stopped. However, it is an advantage that the casing spear 19 can be resynchronized if required before being put back at the bottom of the well 1. This method also allows to limit the relative drift of the two clocks as it ensures a minimum time between their initial synchronization and the recording of the first data, in particular if putting back casing spear 19 is done by free fall.

Retrieving data via a secondary casing spear, suspended at a slickline cable and to be connected to tool 12 when it is lowered, is another solution. In this case, data transfer takes place as soon as the two casing spears are connected and the data will be extracted above ground as soon as the secondary casing spear has been brought back.

Another method consists in setting up the connection through an electric cable from the surface to the casing spear 19 via leak-free connector 22 (as described regarding synchronization); it is then possible to extract the data stored in the memory of casing spear 19 directly from the surface.

Finally, a last solution consists in using the electromagnetic transmission between the underground and the surface, which does not require the drilling operations to be stopped, but only allows a very limited amount of data to be transmitted due to the low throughput of the link; data compression and signal processing directly inside the underground tool (so as to transmit only results) could remedy this limitation.

It is planned to place the tool 12 inside drill string 5 next to drill bit 4, but it could also be higher up in the drill string if the operating conditions, in particular the temperature, were better there. Drilling conditions permitting, e.g. if the well is stable and there is no risk of sticking, the recording procedure will consist in placing the tool downhole, pressing at several tons, placing drill string 5 on props and disconnecting it form the square rod or the drive motor. These conditions ensure the best coupling of the tool sensor 18 to the formation and the least background noise. If drilling conditions are less favorable, it will be possible to perform the recording at the time of adding bits when the drill string 5 is on props and disconnected from the drive rod or the motor. In this case, the sensor to formation coupling will be done through the contact between the stabilizers and the walls of well 1.

The use of the seismic source 6 can be repeated several times at fixed or variable intervals, e.g. for six 20 second spaced shots, in order to increase the signal/noise ratio by summing the shot responses, according to known processing methods. The recording time at the underground tool 12 can be adjusted accordingly before the tool 12 is lowered into the well or before each recording if the electromagnetic link is used.

If it is chosen to associate several of these elements and methods in a practical embodiment of the invention, casing spear 19 and associated elements can have the schematic appearance of FIG. 4: a motion sensor 51, an electromagnetic receiver 50, or a flow switch 49, are sending their information to a trigger circuit 52 comprising underground clock 23, and first to respective filters and amplifiers 53, then to an analog/digital converter 54, and finally to a control microprocessor 55.

Clock 23 supplies the signal of oscillator circuit 25 to frequency dividers 56 which contribute to regulating the operating rate of analog/digital converter 54 and microprocessor 55. A random access memory 57 is associated with microprocessor 55 to make timer values, triggering threshold values, etc. available thereto, and for receiving information on the measurement flow. These components and techniques, as well as some of the following ones, are normal and thus do not require a detailed description; however, it will be noted that the electronic circuit 25 is fitted with an output terminal 58 where the signal thereof can be read, and with an input terminal 59 through which the synchronization and setting with respect to the reference clock can be done.

The heating device 27 is composed of a control circuit 60 to which information can be supplied through a temperature set value tap 61, a temperature sensor 62 directing the operation of a heating system 63 such as an electric resistance. Tap 61 allows to apply, in general once and for all when tool 12 is above ground, the temperature desired for quartz 32, and the temperature sensor 62 is preferably a standard instrument, with sufficient accuracy for the required object. If the cooling device 31 is added, it is built in the same way.

The core of the memory module of casing spear 19 is a logic circuit 64 acquiring measurements of tool sensor 18, which get thereto through a filter and an amplifier 65 and another analog/digital converter 66. A temperature sensor 67 is also connected to converter 66, this sensor allowing to record the temperature of well 1. The logic acquisition circuit 64 is also connected to the underground clock 23 and microprocessor 55 through lines 68 and 69 supplying it with the frequency required for the acquisition and the recording start and stop signals. The results measured and recorded by the logic acquisition circuit 64 build up in a non volatile memory 70, which can be read and emptied through a read interface 71 the output terminal 72 of which further leads to a plug for connecting an adequate instrument (if readout takes place when tool 12 is brought back from well 1), to an electromagnetic transmitter or an electric cable if this is in place.

A power supply 73 supplies the required power to the various parts of tool 12. The trigger circuit 52 and the memory module can be placed in the casing spear 19, as well as power supply 73, sensors 49 and 51, filter and amplifier 65, and sensors 18 and 50 in the leak-free chamber 17. The motion sensor 51 is the sensor that is used for detecting the movements of drill string 5; the electromagnetic receiver 50 is used in conjunction with transmitter 11; and flow switch 49, sensitive to pressure variations in drill string 5, is used like the other two ones for controlling the start of the recordings.

What is claimed is:

1. A device for performing seismic measurements inside a well during drilling, comprising a surface seismic source, a recorder connected to a reference seismic sensor, a downhole seismic sensor located inside a tool placed inside a drill string, wherein the seismic sensors are associated with a low drift synchronized clock system comprising a downhole clock unit, said downhole clock unit comprising a thermal enclosure, a dual mode type clock in said thermal enclosure and a controlled thermal regulation system arranged in said thermal enclosure allowing the temperature of the clock to be stabilized at a given value.

2. A device for performing seismic measurements inside a well during drilling, using the drill tool as a seismic source, comprising a recorder connected to one or more surface seismic sensors, a downhole seismic sensor located inside a tool placed inside a drill string, said seismic sensors are associated with a low drift synchronized clock system comprising a downhole clock unit, said downhole clock unit comprising a thermal enclosure, a dual mode type clock enclosed in said thermal enclosure and a controlled thermal regulation system arranged in said thermal enclosure allowing the temperature of the clock to be stabilized at a given temperature.

3. A device for performing seismic measurements inside a well during drilling, using the drill tool as a seismic source, comprising a surface seismic source, a recorder connected to a reference seismic sensor, a downhole seismic sensor located inside a tool placed inside a drill string, wherein the seismic sensors are associated with a low drift synchronized clock system, characterized in that the clock of the tool is a dual mode type clock enclosed in a thermal enclosure and a thermal regulation system is arranged in the enclosure allowing the temperature of the clock to be stabilized at a given value, and in that the thermal regulation system can be driven so that the control temperature can be changed depending on the conditions of the well.

4. The device according to any one of claims 1 to 2, characterized in that the thermal regulation system comprises a heating means.

5. The device according to any one of claims 1 to 2, characterized in that the thermal regulation system comprises a cooling means.

6. The device according to any one of claims 1 to 2, characterized in that the thermal regulation system combines a heating means and a cooling means.

7. The device according to any one of claims 1 to 2, for directly connecting the tool, when it is above ground, and the control module in order to synchronize the two clocks they contain.

8. The device according to any one of claims 1 to 2, characterized in that the successive recording starts of the tool are performed automatically at regular intervals defined beforehand.

9. The device according to any one of claims 1 to 2, characterized in that it comprises a motion sensor for starting the recording by communicating predefined movements to the drill string.

10. The device according to any one of claims 1 to 2, characterized in that it comprises an electromagnetic transmission system between the control module and the tool for directly synchronizing the underground and above ground measurements, checking this synchronization after the event, sending a recording start command to the tool, sending a new control temperature value of the clock, or sending part of the recorded data to the surface.

11. The device according to any one of claims 1 to 2, characterized in that it comprises an electric cable that can be lowered into the well and thus connect the control module and the tool for synchronizing both clocks, changing the control temperature value of the tool clock, or reading the data recorded in the memory of tool.

12. The device according to any one of claims 1 to 2, characterized in that it comprises an anchoring system for fishing a casing spear by means of a slickline cable, bringing it back to the surface for synchronizing both clocks, changing the control temperature value of the tool clock, or reading the data recorded, then putting it back in place either by free fall through the inside of the drill bits or by means of the slickline cable.

13. The device according to any one of claims 1 to 2, characterized in that it comprises a slickline cable for lowering into the well either a secondary casing spear, initially synchronized above ground with the control module and to be connected to a main casing spear for synchronizing the latter and reading the data contained therein, or a fishing tool for bringing back the casing spear to the surface for reading the recorded data or performing a synchronization, then placing it back into a drill collar.

14. The device according to any one of claims 1 to 2, characterized in that it comprises a flow switch for starting a recording with tool.

15. A method for performing seismic measurements in a well during drilling, comprising in installing a seismic source, a surface reference seismic sensor, a downhole seismic sensor in a tool of a drill string, in providing low drift clock sensors, in installing the downhole sensor clock in a thermal enclosure provided with a controlled thermal regulation system, characterized in that the clocks are subject to a synchronization prior to recordings, before the tool is lowered into the well and seismic waves are sent to the sensors, and in that the downhole sensor clock is maintained at a constant temperature through thermal regulation by the controlled thermal regulation system.

16. A method for performing seismic measurements in a well during drilling, comprising in installing a seismic source, a surface reference seismic sensor, a downhole seismic sensor in a tool of a drill string, providing low drift clock sensors, lowering the tool into the well and generating seismic waves, characterized in that the downhole clock is maintained at a given but variable temperature, and in that a synchronization of the clocks is performed when the given temperature is modified.

17. A method for performing seismic measurements in a well during drilling, comprising in installing a seismic source, a surface reference seismic sensor, a downhole seismic sensor clock in a tool of a drill string, in providing low drift clock sensors, characterized in that the clocks are subject to a synchronization prior to recordings, before the tool is lowered into the well and seismic waves are sent to the sensors, in that the downhole sensor clock is maintained at a constant temperature through thermal regulation, and in that the synchronization of the clocks can be reproduced after the tool has been lowered into the well, either through electromagnetic transmission of a synchronization code, or through an electric cable, either by bringing back a main casing spear by means of a slickline cable and putting it back in place by free fall through the drill string or through the slickline cable, or via a secondary casing spear to be connected to the main casing spear.

18. A method for performing seismic measurements in a well during drilling, comprising in using a drill tool as a seismic source and installing a downhole seismic sensor in the tool of a drill string, surface seismic sensors, in providing the low drift clock sensors, in installing the downhole sensor clock in a thermal enclosure provided with a controlled thermal regulation system, characterized in that the clocks are subject to a synchronization prior to recordings, before the tool is lowered into the well and seismic waves are sent to the sensors, and in that the clock of the downhole sensor is maintained at a constant temperature through thermal regulation by the controlled thermal regulation system.

19. A method for performing seismic measurements in a well during drilling, comprising in using the drill tool as a seismic source, installing a reference seismic sensor in the tool of a drill string, surface seismic sensors, providing low drift clock sensors, lowering the tool into the well, and generating seismic waves, characterized in that the downhole clock is maintained at a given but variable temperature, and in that a synchronization of the clocks is when the given temperature is modified.

20. A method for performing seismic measurements in a well during drilling, comprising in using a drill tool as a seismic source and installing a reference seismic sensor in the tool of a drill string, surface seismic sensors, in providing the low drift clock sensors, characterized in that the clocks are subject to a synchronization prior to recordings, before the tool is lowered into the well and seismic waves are sent to the sensors, in that the clock of the downhole sensor is maintained at a constant temperature through thermal regulation, and in that the synchronization of the clocks can be reproduced either through electromagnetic transmission of a synchronization code, either through an electric cable, or by bringing back a main casing spear by means of a slickline cable and by putting it back in place by free fall through the drill string or through the slickline cable, or via a secondary casing spear to be connected to the main casing spear.

21. The method according to any one of claims 15, 16, 18, or 19 characterized in that, on a drill string return trip, the seismic recordings that have been performed are repeated at the same readings during the drilling phase so that the synchronization of the measurements between these two moments can be controlled.

22. The method for performing seismic measurements according to any one of claims 15, 16, 18, or 19, characterized in that it comprises a command for starting the measurement recordings, either automatically at regular intervals defined beforehand, or by communicating a series of given movements to the drill string, either through an electromagnetic transmission or a flow switch.

23. The method for performing seismic measurements according to any one of claims 15, 16, 18, or 19, characterized in that it comprises retrievals of recorded data, before bringing back the drill sting, either by temporarily bringing back the main casing spear by means of the slickline cable, or by reading through an electric cable, or by an electric transmission, or via a secondary casing spear lowered at the slickline cable and to be connected to the main casing spear.

24. A device for performing seismic measurements inside a well during drilling, using the drill tool as a seismic source, comprising a recorder connected to one or more surface seismic sensors, a downhole seismic sensor located inside a tool placed inside a drill string, wherein the seismic sensors are associated with a low drift synchronized clock system, characterized in that the clock of the tool is a dual mode type clock enclosed in a thermal enclosure and a thermal regulation system is arranged in the enclosure allowing the temperature of the clock to be stabilized at a given temperature, and in that the thermal regulation system can be driven so that the control temperature can be changed depending on the conditions of the well.

25. A method for performing seismic measurements in a well during drilling, comprising in installing a seismic source, a surface reference seismic sensor, a downhole seismic sensor in a tool of a drill string, providing low drift clock sensors, lowering the tool into the well and generating seismic waves, characterized in that the downhole clock is maintained at a given but variable temperature, in that a synchronization of the clocks is performed when the given temperature is modified, in that the synchronization of the clocks can be reproduced after the tool has been lowered into the well, either through electromagnetic transmission of a synchronization code, or through an electric cable, either by bringing back a main casing spear by means of a slickline cable and putting it back in place by free fall through the drill string or through the slickline cable, or via a secondary casing spear to be connected to the main casing spear.

26. A method for performing seismic measurements in a well during drilling, comprising in using the drill tool as a seismic source, installing a reference seismic sensor in the tool of a drill string, surface seismic sensors, providing low drift clock sensors, lowering the tool into the well, and generating seismic waves, characterized in that the downhole clock is maintained at a given but variable temperature, in that a synchronization of the clocks is when the given temperature is modified, and in that the synchronization of the clocks can be reproduced either through electromagnetic transmission of a synchronization code, either through an electric cable, or by bringing back a main casing spear by means of a slickline cable and by putting it back in place by free fall through the drill string or through the slickline cable, or via a secondary casing spear to be connected to the main casing spear.

* * * * *